April 27, 1965 E. V. BOBLETT 3,181,172

STORAGE MEDIA

Filed Dec. 26, 1962

EMIL V. BOBLETT
INVENTOR

BY Nathan N. Kallman

ATTORNEY

United States Patent Office 3,181,172

Patented Apr. 27, 1965

3,181,172

STORAGE MEDIA

Emil V. Boblett, Los Altos Hills, Calif., assignor to Ampex Corporation, Redwood City, Calif., a corporation of California Filed Dec. 26, 1962, Ser. No. 247,198
3 Claims. (Cl. 346—135)

Figure 2:
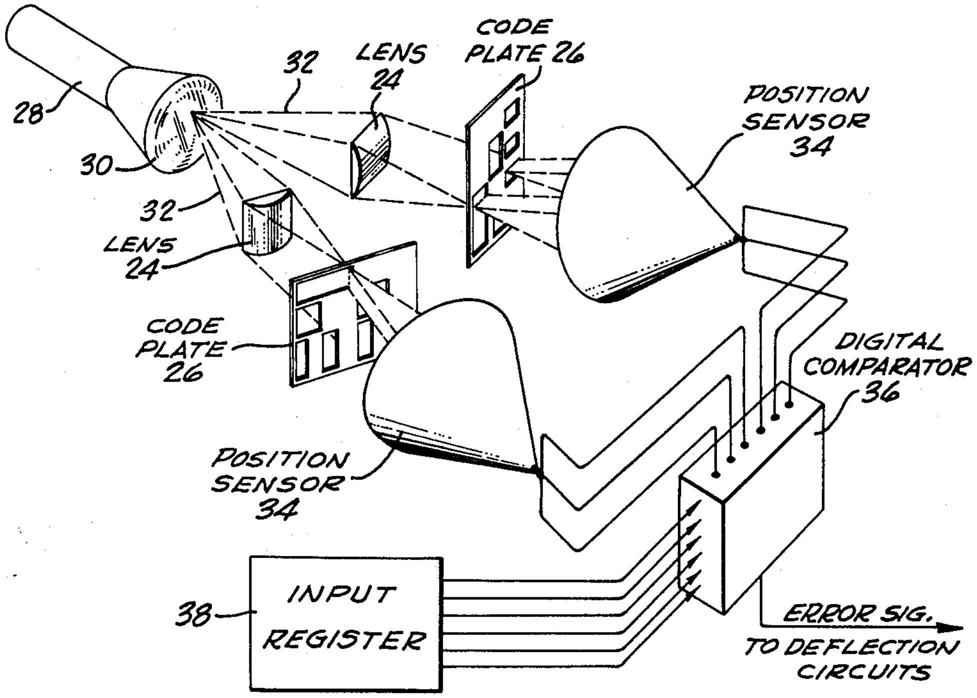

This invention relates to novel storage media that afford electron beam recording and readout, and in particular to those storage media that register information by contours or undulations on a surface.

One type of medium that lends itself readily to electron beam recording and readout is a thermoplastic film. During recording, a modulated beam of electrons is directed at the thermoplastic film, which is heated. Electrons from the beam are deposited on film, and electrostatic forces induced by the electrons cause deformation of the surface such that contours or undulations representing the modulating information is recorded. These deformations remain in the surface and may be read out by optical or electron beam readout means.

Another type of information storage medium utilizes a photopolymer, which may be a transparent plastic film. When exposed to photons or electrons, the film is polymerized at the exposed areas. Thereafter the film is washed in hot water and the unexposed or monomer portions are removed leaving the exposed or polymerized regions in a profile or contour configuration.

It is highly preferable to employ an electron beam for reading out recorded information. High scanning speeds are possible with an electron beam, and therefore very high frequency signals may be read out thereby. Also, an electron beam with a controlled beam spot size can be utilized to scan very minute information areas or bits of recorded medium that affords high packing density.

An object of this invention is to provide novel and improved high density storage media that may be read out by means of electron beam scanning.

Another object of this invention is to provide a scanning readout system for a recorded medium wherein accurate tracking and scan position sensing are provided.

In accordance with this invention, a storage medium comprises a mixture of a storage material, such as a thermoplastic or photopolymer, that registers information in the form of surface contours or grooves; and a scintillator material that emits photons or light energy in response to electron beam energy, as may be provided by an impinging electron beam. Recording of information is achieved by scanning the medium with a modulated electron beam and by developing the recorded information whereby contours or grooves appear on the surface of the storage material.

Readout is accomplished by electron beam scanning of the recorded medium whereby the scintillator material is activated to provide photon emission in accordance with the stored information. To achieve sensing of the instantaneous position of the scanning beam, a coding system directs emitted photons in a coded pattern to light energy sensing apparatus that determines the instantaneous position of the scanning beam on the storage medium. If the scanning electron beam is not tracking the record grooves accurately, an error signal is developed for application to deflection circuits that correct the path of the electron beam.

Figure 1:
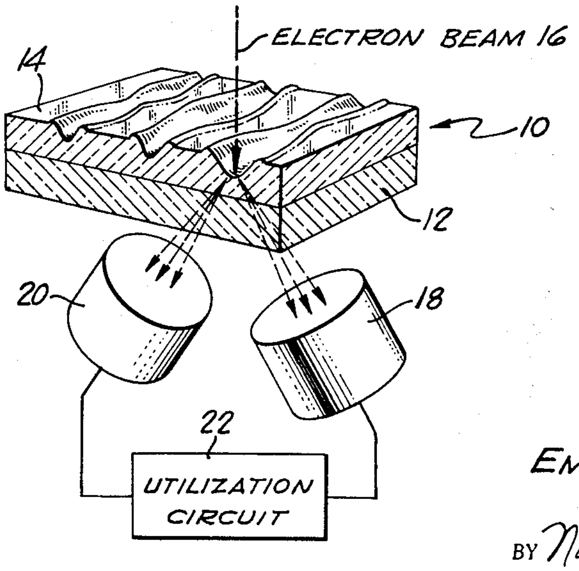

The invention will be described in greater detail with reference to the drawing in which:

FIGURE 1 is a perspective view of the inventive storage medium, shown with a simplified readout system; and FIGURE 2 is a schematic perspective layout of a readout and tracking system that may be used with the storage medium of this invention.

An embodiment of the invention is illustrated in FIGURE 1 wherein a storage medium 10 comprises a transparent base 12, which may be a flexible support such as Mylar (trademark of the DuPont Company), and a grooved film 14 having information previously recorded or registered thereon. The film 14 may be formed from a thermoplastic material or a photopolymer, each of which develops contours along the surface in accordance with the information recorded by means of electron beam scanning.

In accordance with this invention, the thermoplastic or photopolymer layer 14 also includes a scintillator material that emits light rays or photons in response to an impinging electron beam 16. During the recording mode, the electron beam 16 generated in a cathode ray tube 28 (FIGURE 2) scans the relatively smooth film 14, and deposits electrons thereon in accordance with the modulation of the beam 16. In the case where a thermoplastic film is used, the film 14 is heated and contours or undulations are formed in accordance with the number of electrons deposited on the film by the modulating beam, which in turn represents the modulating information to be recorded.

When a photopolymer is employed, the recording electron beam causes polymerization of the transparent film in accordance with the modulating information. After exposure to the beam, the photopolymer film is washed in hot water such that the unexposed or monomer portions are removed thereby leaving the exposed or polymerized regions standing in profile. The final structure of a recorded photopolymer and scintillator is similar in nature to the recorded thermoplastic and scintillator in that both films form contours or a relief surface as a result of scanning with a modulated electron beam.

To read out the recorded information, the scanning electron readout beam 16 traverses the recorded film 14 energizing the scintillator material contained in the film. Light radiation is produced and transmitted successively from each discrete area or information bit with an intensity or magnitude corresponding to the depth of the depression or concavity at such bit or area. The transmitted light energy is received by a pair of fixed photomulitpliers 18 and 20 that sense the magnitude of the light energy. The electrical signals produced by each photomultiplier 18 and 20 are added in a utilization circuit 22 and further processed for display or other form of readout. The electrical signals may also be employed to determine whether the beam 16 is centered in the groove being scanned.

A scintillating thermoplastic film 14 may be formed from a mixture of 1% anthracene; 20% m-terphenyl; and 79% Pliolite S5E (copolymer styrene and butadiene). The compounds were dissolved in the order listed in a mixture of solvents containing 14% benzene; 14% methyl ethyl ketone; and 72% toluene, and the solvents were evaporated.

With reference to FIGURE 2, a beam position sensing or tracking system comprises a coding apparatus that includes a plurality of optical lenses 24 and code plates 26. For convenience and the purpose of clarity, only two lenses and a pair of plates are shown, but it is to be understood that several lenses and plates may be utilized to achieve the position sensing function.

A cathode ray tube 28 provides an electron readout beam 16 for scanning the recorded medium 10 that is disposed adjacent to the inner surface of the face plate 30 of the tube 28. The medium 10 may be drawn through the tube 28 at a substantially constant speed by known means. As the beam scans the medium 10, the scintillator in the recorded film 14 produces light radiation in succession from each area being scanned by the electron beam 16. Light rays 32 are passed through the optical lenses 24 and are directed through coded apertures found in the plates 26, in accordance with the instantaneous position of the scanning beam.

The coded light rays are sensed by position sensors 34, and a digital comparator 36 receives electrical signals from the sensors 34. At the same time an address system comprising an input register 38 feeds signals to the comparator 36 for comparison with the signals generated by the light rays to produce an error signal. The error signal is applied to the deflection circuits of the cathode ray tube 28 to correct the tracking path of the electron beam 16. A description of such a coding system is found in the Bell System Technical Journal, September 1958, pages 1161–1193, in the article entitled "Fundamental Concepts in the Design of the Flying Spot Store" by Hoover et al. (see especially pages 1173–1174 and FIGURES 3, 4 and 7). It should be noted that the number of output signals from the input register 38 and position sensors 34 are not necessarily limited to that shown in the drawing. Also, there may be alternative systems that may be used for beam positioning, and therefore the scope of this invention is not limited to the use of the coding and sensing system set forth herein.

In addition, random access is made possible during both record or playback by the use of a scintillator in the storage medium in conjunction with the coding system. For example, if the medium is partially recorded and has a known unrecorded area, then the beam could be directed to such void area for additional recording. Similarly, during readout any information area can be reached quickly by use of a memory addressing the code plates to achieve random access.

There has been described herein an information storage medium that registers information by surface contours on a film, wherein the film incorporates a scintillator to enable readout by electron beam scanning in combination with optical and electrical means.

What is claimed is:

1. A signal storage medium comprising:
a transparent base; and
an information storage film disposed on such base formed with a contoured surface, the contours being representative of information, said film including a scintillating material.

2. A signal storage medium comprising:
a transparent base; and
a signal storage film formed from a mixture of thermoplastic material and a scintillating material disposed on such base said signal storage film having a contoured surface with said contours being representative of information.

3. A storage medium comprising:
a flexible transparent base; and
a signal storage film formed from a mixture of thermoplastic material and a scintillating material disposed on such base said signal storage film having a contoured surface with said contours being representative of information.

References Cited by the Examiner

UNITED STATES PATENTS

| | | | |
|---|---|---|---|
| 2,000,527 | 5/35 | Linderman | 346—135 |
| 2,156,289 | 5/39 | Hoy | 346—135 |
| 2,747,997 | 5/56 | Smith et al. | 96—35 |
| 2,985,866 | 5/61 | Norton | 346—77 |
| 3,063,872 | 11/62 | Boldebuck | 117—218 |
| 3,084,334 | 4/63 | Martin | 340—173 |
| 3,095,324 | 6/63 | Cusano et al. | 117—106 |
| 3,099,820 | 7/63 | Ketchledge | 340—173 |
| 3,113,179 | 12/63 | Glenn | 346—77 |
| 3,118,785 | 1/64 | Anderson et al. | 117—218 |

LEYLAND M. MARTIN, *Primary Examiner.*

S. SRAGOW, LEO SMILOW, *Examiners.*